United States Patent
Chu et al.

(10) Patent No.: US 7,411,379 B2
(45) Date of Patent: Aug. 12, 2008

(54) APPARATUS AND METHOD FOR OVER-VOLTAGE AND OVER-CURRENT PROTECTION FOR A STEP-UP CURRENT-MODE CONVERTER

(75) Inventors: Kwan-Jen Chu, Hsinchu (TW); Chung-Lung Pai, Hsinchu (TW); Chun-Chin Tung, Shulin (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 152 days.

(21) Appl. No.: 11/305,237

(22) Filed: Dec. 19, 2005

(65) Prior Publication Data
US 2006/0132997 A1 Jun. 22, 2006

(30) Foreign Application Priority Data
Dec. 21, 2004 (TW) .............................. 93139896 A

(51) Int. Cl.
*G05F 1/56* (2006.01)

(52) U.S. Cl. .................................... 323/284; 323/285
(58) Field of Classification Search ......... 323/282–287, 323/222, 268, 270–275; 363/41, 48, 56, 363/89
See application file for complete search history.

(56) References Cited

U.S. PATENT DOCUMENTS 6,194,884 B1 * 2/2001 Kesler et al. ................ 323/285

* cited by examiner

*Primary Examiner*—Rajnikant B Patel
(74) *Attorney, Agent, or Firm*—Rosenberg, Klein & Lee

(57) ABSTRACT

In an apparatus for over-voltage and over-current protection for a step-up current-mode converter including an inductor connected via a phase node to a switch that is switched by a control signal to convert an input voltage to an output voltage, a controller has a multiplexed pin, and a resistor and a capacitor are connected in parallel between the multiplexed pin and the phase node. In an over-voltage protection mode, the controller senses the voltage on the multiplexed pin, and in an over-current protection mode, the controller supplies a current to flow through the resistor and senses the voltage on the multiplexed pin.

11 Claims, 5 Drawing Sheets

APPARATUS AND METHOD FOR OVER-VOLTAGE AND OVER-CURRENT PROTECTION FOR A STEP-UP CURRENT-MODE CONVERTER

FIELD OF THE INVENTION

The present invention is related generally to a step-up current-mode converter and, more particularly, to an apparatus and method for over-voltage and over-current protection for a step-up current-mode converter.

BACKGROUND OF THE INVENTION

Over-voltage and over-current protection mechanisms are provided in a conventional step-up current-mode converter to prevent the inductor current and the output voltage of the converter from being excessive. As shown in FIG. 1, a conventional asynchronous step-up current-mode converter 100 comprises a controller 102 having a pin EXT to output a control signal S1 to switch a transistor 108 connected between a phase node 106 and ground GND, by which, when the transistor 108 turns on, an inductor current Iin is produced and flows through the transistor 108 and an inductor 104 connected between an input voltage Vin and the phase node 106, and when the transistor 108 turns off, the inductor current Iin flows through a diode 110 to charge a capacitor Co, to thereby produce an output voltage Vout. Two resistors R1 and R2 are connected in series between the converter output Vout and ground GND to divide the output voltage Vout to produce a voltage $V_{FB}$ fed back to a pin FB of the controller 102 so as to determine the signal S1. To prevent the inductor current Iin from being so large to damage the transistor 108, the controller 102 uses a pin CS connected to the phase node 106 through a resistor Rcs for sensing the inductor current Iin, by which, when the inductor current Iin is greater than a threshold value, the controller 102 will turn off the transistor 108 to avoid damage to the transistor 108. On the other hand, to prevent the output voltage Vout from being so high to damage the load circuit connected to the converter output Vout, the controller 102 uses a pin OVP to sense the output voltage Vout, and when the output voltage Vout is greater than a threshold value, the controller 102 will turn off the input voltage Vin or ground the converter output Vout to avoid damage to the load circuit connected to the converter output Vout.

Thus, to achieve over-voltage and over-current protection, the conventional step-up current-mode converter 100 is required two pins CS and OVP to separately sense the inductor current Iin and the output voltage Vout, and each additional pin requires more chip area and cost for the controller 102. Particularly for a multi-channel step-up current-mode converter, for example an N-channel one as shown in FIG. 2, a controller 150 therefor is required two pins OVP_J and CS_J (J=1,2, . . . , N) for each channel to achieve over-voltage and over-current protection, thus the pin count of the controller 150 increases dramatically.

Therefore, it is desired an apparatus and method to achieve over-voltage and over-current protection by utilizing fewer pins.

SUMMARY OF THE INVENTION

One object of the present invention is to provide an apparatus and method for over-voltage and over-current protection for a step-up current-mode converter.

Another object of the present invention is to provide an apparatus and method to achieve over-voltage and over-current protection by utilizing a single pin.

In an apparatus for over-voltage and over-current protection for a step-up current-mode converter including an inductor connected via a phase node to a switch that is switched by a control signal to convert an input voltage to an output voltage on a converter output, according to the present invention, a controller has a multiplexed pin, and a resistor and a capacitor are connected in parallel between the multiplexed pin and the phase node, whereby in an over-voltage protection mode, the controller senses the voltage on the multiplexed pin to determine whether the output voltage is excessive, and in an over-current protection mode, the controller supplies a current to flow through the resistor and senses the voltage on the multiplexed pin to determine whether the current flowing through the switch is excessive.

According to the present invention, the over-voltage and over-current protection functions are accomplished by utilizing only one pin, and therefore the number of pins is decreased. As a result, the chip area and the cost are reduced. Particularly in the application of a multi-channel step-up current-mode converter, the pin count, the cost and the area are dramatically reduced.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
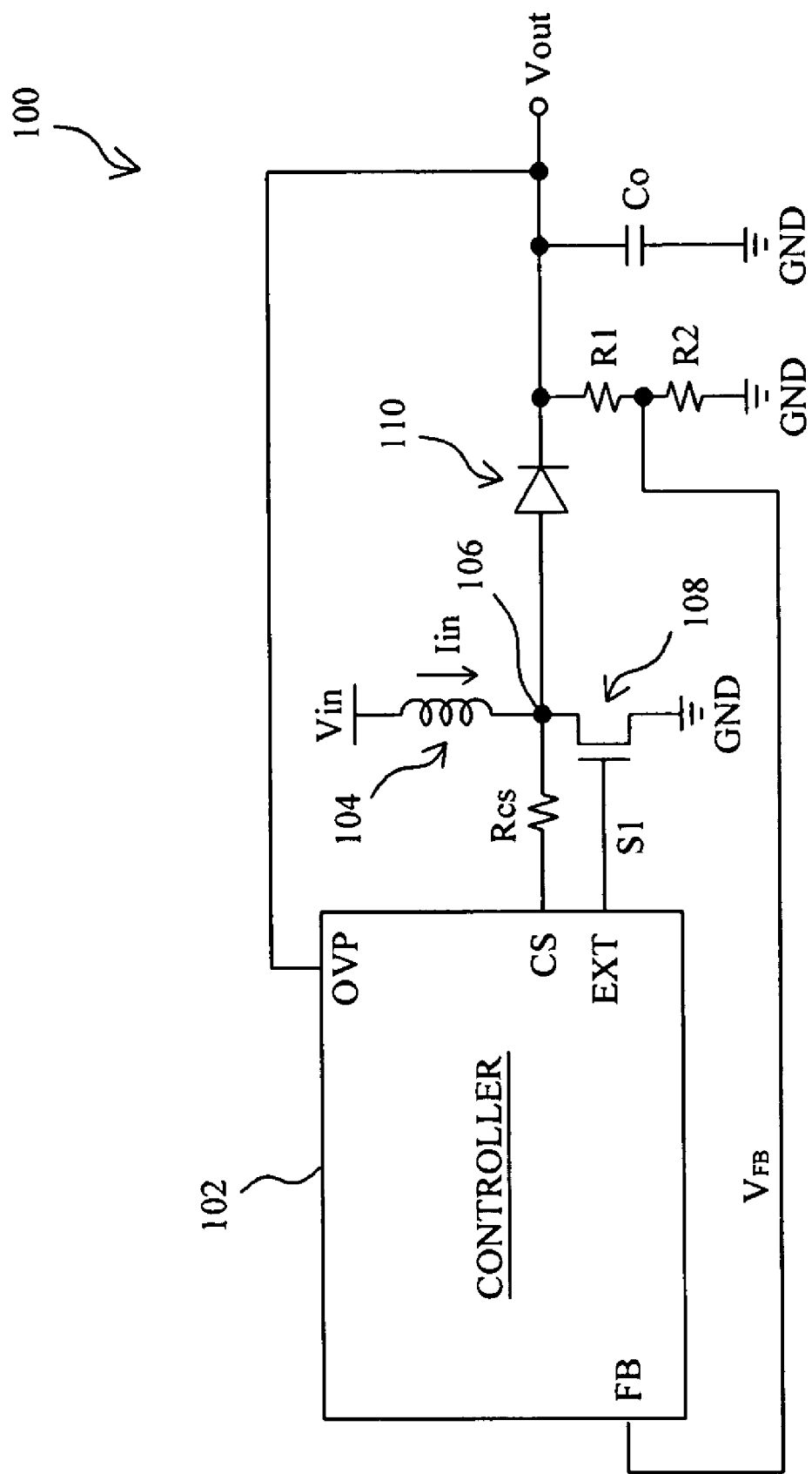
FIG. 1 shows a conventional asynchronous step-up current-mode converter.
Figure 2:
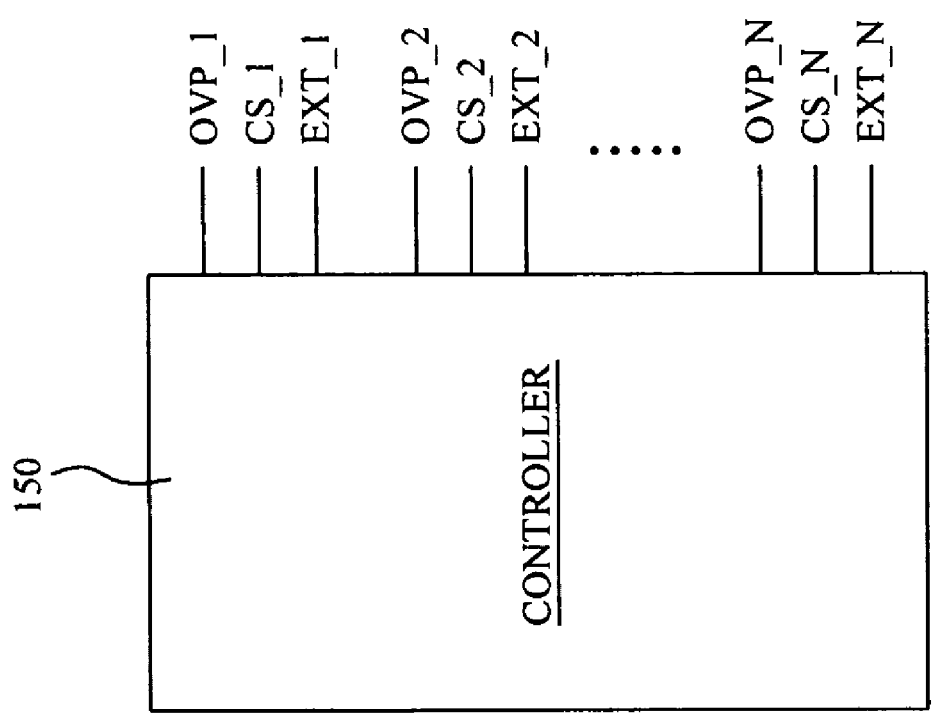
FIG. 2 shows a controller for a conventional multi-channel step-up current-mode converter.
Figure 3:
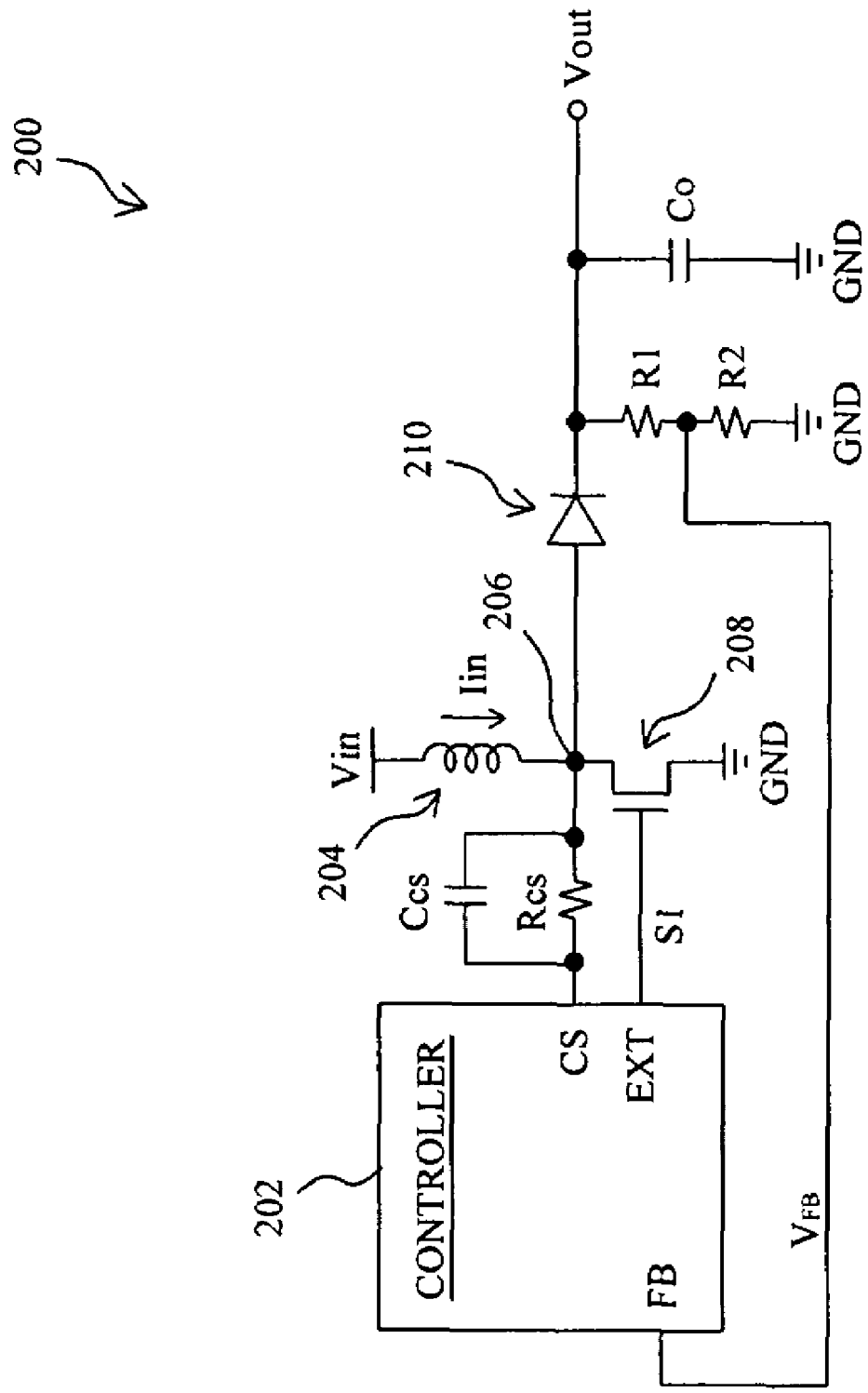
FIG. 3 shows an asynchronous step-up current-mode converter employing an apparatus according to the present invention.

FIG. 3 shows an asynchronous step-up current-mode converter 200 employing an apparatus according to the present invention, in which an inductor 204 is connected between an input voltage Vin and a phase node 206, a transistor 208 is connected between the phase node 206 and ground GND, and a controller 202 outputs a control signal S1 with a pin EXT to the gate of the transistor 208 to switch the transistor 208. When the transistor 208 turns on, an inductor current Iin flows through the inductor 204 and the transistor 208, and when the transistor 208 turns off, the inductor current Iin flows from the inductor 204 through a diode 210 to charge a capacitor Co to thereby produce an output voltage Vout. Two resistors R1 and R2 are connected in series between the converter output Vout and ground GND to divide the output voltage Vout to produce a voltage $V_{FB}$ fed back to a pin FB of the controller 202 to modulate the duty cycle of the transistor 208. A resistor Rcs and a capacitor Ccs are connected in parallel between a multiplexed pin CS of the controller 202 and the phase node 206, and the controller 202 achieves the over-voltage and over-current protection by sensing the voltage on the multiplexed pin CS. When the transistor 208 turns on, the controller 202 supplies a current to flow from the pin CS through the resistor Rcs, and the controller 202 senses the voltage on the pin CS. Because of the voltage difference between the pin CS and the phase node 206, the voltage on the phase node 206 can be indirectly obtained, and if the voltage on the phase node 206 is greater than a threshold value, it indicates that the inductor current Iin flowing through the transistor 208 is too large, and the controller 202 will turn off the transistor 208. When the transistor 208 turns off, the controller 202 senses the voltage on the pin CS. Since the capacitor Ccs is connected between the pin CS and the phase node 206, the voltage on the phase node 206 can be indirectly obtained, and furthermore, the output voltage Vout is equal to the sum of the voltage on the phase node 206 and the forward bias voltage of the diode 210, the output voltage Vout can be obtained by sensing the voltage on the pin CS. If the output voltage Vout is greater than a threshold value, the controller 202 will turn off the input voltage Vin or ground the converter output Vout.

Figure 4:
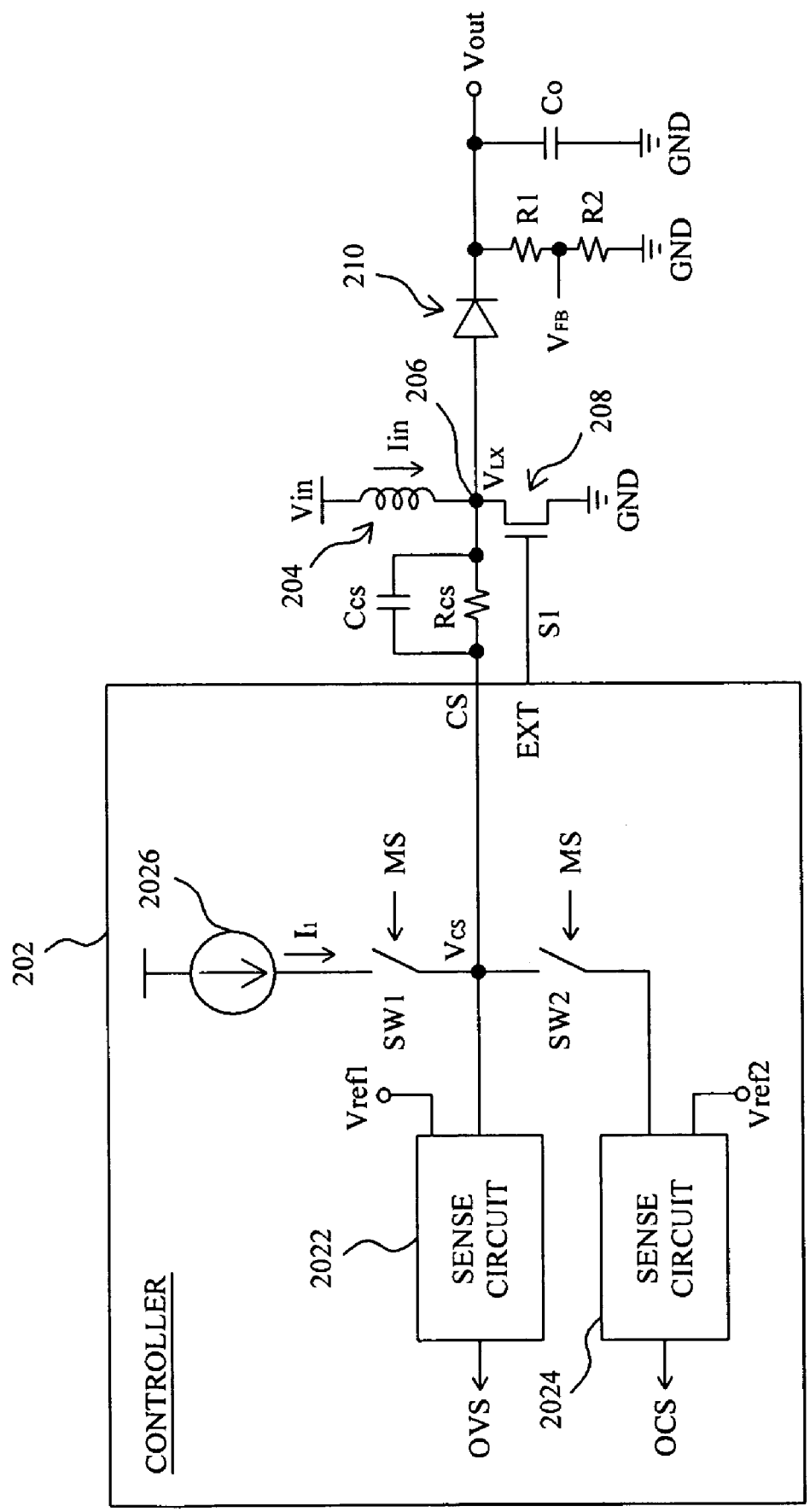
FIG. 4 shows an embodiment of the controller in FIG. 3.

FIG. 4 shows one embodiment of the controller 202 in FIG. 3, in which a sense circuit 2022 and the capacitor Ccs constitute an over-voltage protection circuit, a sense circuit 2024, a current source 2026 and the resistor Rcs constitute an over-current protection circuit, and a switch SW1 connected between the current source 2026 and the multiplexed pin CS and a switch SW2 connected between the multiplexed pin CS and the sense circuit 2024 are controlled by a mode switch signal MS to switch the controller 202 between an over-voltage protection mode and an over-current protection mode. For instance, if the control signal S1 is used as the mode switch signal MS, the switches SW1 and SW2 will be switched synchronous to the switching of the transistor 208.

When all of the transistor 208, the switches SW1 and SW2 turn on, the controller 202 is in the over-current protection mode, the inductor current Iin flows through the transistor 208, and the current source 2026 supplies the current I1 to the multiplexed pin CS. Since both the sense circuits 2022 and 2024 have high input impedance, the current I1 will flow to the resistor Rcs, causing the voltage on the multiplexed pin CS to be $$Vcs = I1 \times Rcs + Iin \times Ron, \quad [EQ\text{-}1]$$

where Ron is the on-resistance of the transistor 208. Because I1, Rcs and Ron are known, the sense circuit 2024 can determine whether the inductor current Iin is too large by sensing the voltage Vcs on the multiplexed pin CS. Furthermore, the threshold value for the inductor current Iin can be set in advance based on the current I1, the resistors Rcs and Ron. When the voltage Vcs is greater than or equal to a reference voltage Vref2 provided for the sense circuit 2024, it indicates that the inductor current Iin is greater than the threshold value, and the sense circuit 2024 generates an over-current signal OCS to turn off the transistor 208 to prevent damage to the transistor 208.

When all of the transistor 208, the switches SW1 and SW2 turn off, the controller 202 is in the over-voltage protection mode, the inductor current Iin flows through the diode 210 to charge the capacitor Co to produce the output voltage Vout. According to the circuit theory, the voltage on the phase node 206 is $$V_{LX} = Vout + Vd, \quad [EQ\text{-}2]$$

where Vd is the forward bias voltage of the diode 210. The capacitor Ccs connected in parallel to the resistor Rcs can rapidly sense the voltage $V_{LX}$, and the voltage on the multiplexed pin CS is $$Vcs = V_{LX}. \quad [EQ\text{-}3]$$

The sense circuit 2022 senses the voltage Vcs on the multiplexed pin CS and compares it with a reference voltage Vref1. According to the equations EQ-2 and EQ-3, it is known that the voltage Vcs on the multiplexed pin CS is related to the output voltage Vout, thus the output voltage Vout can be obtained by sensing the voltage Vcs. When the voltage Vcs is greater than or equal to the reference voltage Vref1, it indicates that the output voltage Vout is to large, and the sense circuit 2022 will generate an over-voltage signal OVS to turn off the input voltage Vin or ground the converter output Vout to prevent damage to the load circuit connected to the converter output Vout.

Figure 5:
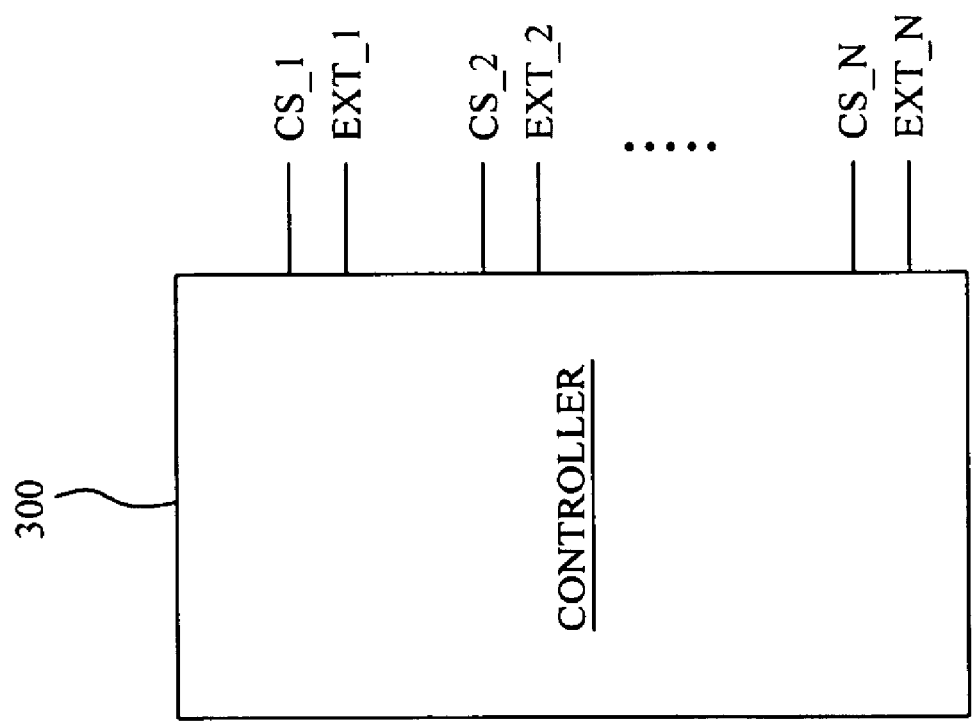
FIG. 5 shows a controller for a multi-channel step-up current-mode converter according to the present invention.

In the above embodiments, although the single-set asynchronous step-up current-mode converter 200 is taken for example in the description, those skilled in the art may easily to modify and apply the apparatus and method of the present invention to single-set synchronous, multi-channel asynchronous and multi-channel synchronous step-up current-mode converters. For instance, for a multi-channel step-up current-mode converter employing a controller 300 shown in FIG. 5, each channel needs only one pin CS_J (J=1,2, . . . , N) to achieve over-voltage and over-current protection, the controller 300 has N less pins than a conventional multi-channel step-up current-mode converter, therefore the cost and chip area of the controller 300 are dramatically reduced.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for over-voltage and over-current protection for a step-up current-mode converter including an inductor connected via a phase node to a switch that is switched by a control signal to convert an input voltage to an output voltage, the apparatus comprising:
    a controller for generating the control signal, the controller having a multiplexed pin;
    a resistor connected between the multiplexed pin of the controller and the phase node; and
    a capacitor connected between the multiplexed pin of the controller and the phase node;
    wherein in an over-voltage protection mode, the controller senses the voltage on the multiplexed pin; and
    wherein in an over-current protection mode, the controller alternatively supplies a current to flow through the resistor and senses the voltage on the multiplexed pin.

2. The apparatus of claim 1, wherein the controller comprises a sense circuit for comparing the voltage on the multiplexed pin with a reference voltage in the over-voltage protection mode.

3. The apparatus of claim 1, wherein the controller comprises:
    a current source for supplying the current to flow through the resistor in the over-current protection mode; and
    a sense circuit for comparing the voltage on the multiplexed pin with a reference voltage in the over-current protection mode.

4. The apparatus of claim 3, wherein the controller further comprises:
    a second switch connected between the current source and the multiplexed pin; and
    a third switch connected between the multiplexed pin and the sense circuit;
    wherein in the over-current protection mode, the second switch is switched by a mode switch signal to connect the current source to the multiplexed pin, and the third switch is switched by the mode switch signal to connect the sense circuit to the multiplexed pin.

5. The apparatus of claim 4, wherein the mode switch signal is synchronous to the control signal.

6. A method for over-voltage and over-current protection for a step-up current-mode converter including an inductor connected via a phase node to a switch that is switched by a control signal provided by a controller to convert an input voltage to an output voltage, the method comprising the steps of:

connecting a resistor and a capacitor in parallel between a multiplexed pin defined on the controller and the phase node;

sensing the voltage on the multiplexed pin of the controller in an over-voltage protection mode; and alternatively supplying a current to flow through the resistor and sensing the voltage on the multiplexed pin of the controller in an over-current protection mode.

7. The method of claim 6, further comprising the step of comparing the voltage on the multiplexed pin with a reference voltage in the over-voltage protection mode.

8. The method of claim 6, further comprising the step of comparing the voltage on the multiplexed pin with a reference voltage in the over-current protection mode.

9. The method of claim 6, further comprising the step of switching between the over-voltage protection mode and the over-current protection mode synchronous to the switching of the switch.

10. The apparatus of claim 1, wherein the controller is selectively configured to alternatively detect through the multiplexed pin an over-current condition for the switch and an over-voltage condition for the output voltage.

11. The method of claim 6, wherein the controller is selectively configured to alternatively detect through the multiplexed pin an over-current condition for the switch and an over-voltage condition for the output voltage.

\* \* \* \* \*